Patented Dec. 7, 1943

2,336,317

UNITED STATES PATENT OFFICE 2,336,317

AROMATIC ESTERS OF ALPHA-HYDROXYISOBUTYRIC ACIDS

Jack T. Thurston, Cos Cob, and John M. Grim, Stamford, Conn., assignors to American Cyanamid Company, New York, N. Y., a corporation of Maine No Drawing. Application November 6, 1940, Serial No. 364,553

2 Claims. (Cl. 260—484)

The present invention relates to a new class of chemical compounds comprising the aromatic esters of alpha-hydroxyisobutyric acid and the hydroxy substituted derivatives thereof.

These new compounds have a wide field of usefulness of considerable commercial importance in the arts. Many of the compounds are slightly viscous liquids having relatively high boiling points while others are solid substances. In general, the compounds are water insoluble but miscible with or solvents for organic compounds. Among the various uses to which the compounds may be put are as solvents for lacquers, inks, and various coating compositions. Many of the compounds are also useful as plasticizers and modifiers for synthetic resins, nitrocellulose, cellulose acetate, cellulose propionate, cellulose ethers and similar compositions. The compounds are also useful as intermediates in the preparation of methacrylates and as latent catalysts in the preparation of resins.

The invention includes broadly any of the aromatic alcohol esters of alpha-hydroxyisobutyric acid as well as such esters when the hydrogen of the hydroxyl group has been replaced by various organic radicals. The following general formula represents the compounds which are included in the present invention:

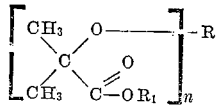

in which R may be hydrogen or an aliphatic, aromatic, cycloaliphatic or heterocyclic radical capable of replacing the hydrogen on the hydroxyl group, or an alkali metal, $n$ is an integer and $R_1$ is an aralkyl radical.

The esters of the present invention may be prepared by any of the methods ordinarily employed in the production of esters and the invention is not intended to be limited by any particular method for producing them. We have found that the aromatic esters of alpha-hydroxyisobutyric acid can be prepared by reacting any suitable aromatic alcohol such as benzyl alcohol with alpha-hydroxyisobutyric acid at elevated temperatures in the presence or absence of a catalyst such as sulfuric acid or toluene sulfonic acid. The esters may likewise be prepared by the ester interchange method or by reacting aralkyl halide such as benzyl chloride with an alkali metal salt of alpha-hydroxyisobutyric acid.

When compounds are to be produced in which the hydrogen of the hydroxyl group is replaced by some other radical, it may be desirable in some instances to produce the aromatic ester first, and then replace the hydrogen of the hydroxyl group with an organic radical such as for example, an acyl radical; and in other cases it may be desirable to replace the hydrogen of the hydroxyl group with an acyl group prior to the production of the ester.

Any aromatic alcohol may be used for producing the esters in accordance with the present invention and includes broadly mono-hydroxy aralkyl compounds in which the alkyl group may either be saturated or unsaturated and also hydroxy aralkyl compounds containing a plurality of aryl radicals including compounds having substituents on the aromatic rings. Among the more common aromatic alcohols that can be used are benzyl alcohol, phenylethyl alcohol, phenylpropyl alcohol, naphthylmethyl alcohol, diphenylmethyl alcohol, diphenylethyl alcohol, cinnamyl alcohol, or any such compound having nitro, halogen, sulfonic acid, alkyl or other substituent groups on the aromatic ring.

In the general formula when R represents an organic acyl radical the compounds usually have a slightly higher boiling point, are more stable and are better solvents for some of the nitrocellulose and similar compositions. Among the various acyl radicals that can be used to replace the hydrogen of the hydroxyl group are the aliphatic acyl radicals such as formyl, acetyl, propionyl, butyryl, octanoyl, and carbonic.

The acyl radical may also be that of a cycloaliphatic acid such as cyclohexyl acetic acid, camphoric acid and the like. The acyl radical may likewise be an aromatic radical such as those of benzoic acid or salicylic acid. Dicarboxylic acids may also be used to acylate the hydroxyl groups in which case two molecules of alpha-hydroxyisobutyric acid are combined with one molecule of the dicarboxylic acid, or the mono-esters of the dicarboxylic acids may be employed in which case one molecule of alpha-hydroxyisobutyric acid will combine with one molecule of the mono-ester of the dicarboxylic acid. Among the various dicarboxylic acids and mono-esters which can be used are those such as succinic, oxalic, diglycolic, sebacic, maleic, naphthalene dicarboxylic, phthalic, chlorophthalic, nitrophthalic, and the like. Ether-acids may also be employed to produce acylated aromatic esters of alpha-hydroxyisobutyric acid in which case R in the general formula represents the radical of an ether-acid such as:

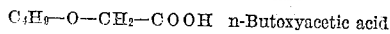
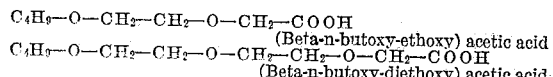
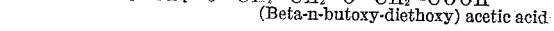
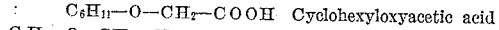
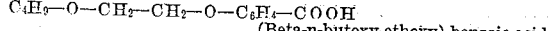
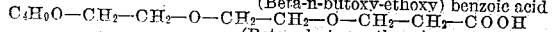

The hydrogen of the hydroxyl group may also be replaced by heterocyclic acids under certain conditions such as for example the radical of nicotinic acid.

As pointed out heretofore the hydrogen on the hydroxyl group may be replaced by an acyl radical either prior to the production of the aromatic ester of alpha-hydroxyisobutyric acid or the ester may be prepared first and then the hydroxyl group acylated. In most cases the acid halides may be used to replace the hydrogen of the hydroxyl groups as for example, acetyl chloride may be used to produce alpha-acetylated esters or acids.

Ethers of the aromatic esters of alpha-hydroxyisobutyric acid are produced when the hydrogen of the hydroxyl group is replaced by either an alkyl, cycloaliphatic, aralkyl, or aryl group and such ether esters have properties differing somewhat from the esters themselves. The alkyl radicals used to replace the hydrogen may be either saturated or unsaturated and may or may not contain substituent groups. Included in this group of alkyl radicals are the methyl, ethyl, propyl, butyl, isobutyl, octyl, as well as alkyl radicals containing carboxylic and oxy groups in the chain to produce compounds such as the following: $(CH_3)_2C[O.CH_2.CH(CH_3)_2].COOR_1$, $R_1.O_2C.CH(CH_3).O.C(CH_3)_2.CO_2.R_1$, $R_1.O_2C.C(CH_3)_2\text{—}O\text{—}CH_2\text{—}CH_2\text{—}O\text{—}$
$CH_2CH_2\text{—}O\text{—}C(CH_3)_2\text{—}CO_2\text{—}R_1$ The hydrogen may also be replaced by alicyclic radicals such as cyclohexanyl, methyl, cyclohexanyl, etc.

The various aralkyl radicals may be also used to replace the hydrogen such as benzyl, phenethyl, phenylpropyl, naphthylmethyl, diphenylmethyl, diphenylethyl, cinnamyl, etc.

The hydrogen of the hydroxyl group may be replaced by any of the aliphatic or aromatic radicals mentioned above by reacting the sodium salt of the aromatic esters of alpha-hydroxyisobutyric acid with the desired aliphatic or aromatic halides or sulfates.

The hydrogen of the hydroxyl group of the aromatic esters of alpha-hydroxyisobutyric acid may also be replaced by groups possessing ketones or aldehyde radicals. For example, halogenated ketones may be reacted with the sodium salt of the aromatic esters of alpha-hydroxyisobutyric acid to split off sodium halide and substitute the ketone radical in place of the hydrogen of the hydroxyl group. For example, when chloroacetone is reacted as described above the following compound is produced:

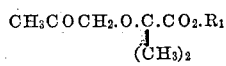

The corresponding aromatic ketones may be used instead of acetone. When chlorinated aldehydes are employed the aldehyde radical replaces the hydrogen in the hydroxyl group.

The carbonic acid esters of the aromatic esters of alpha-hydroxyisobutyric acid can be prepared by reacting the aromatic ester with, for example, ethyl chloroformate to produce the alpha carboethoxy aromatic ester.

Various metal radicals may be used to replace the hydrogen of the hydroxyl group of the esters and particularly active metals such as the alkali metals, sodium and potassium. These salts are produced by adding sodium or potassium to the aromatic ester of alpha-hydroxyisobutyric acid in an inert solvent and refluxing. In some cases it is more desirable to prepare the sodium or potassium salts by reacting the aromatic ester of alpha-hydroxyisobutyric acid with the metallic alkoxides in an inert solvent such as toluene and remove the alcohol by distillation.

The invention will be further described in conjunction with the following specific examples, but they are for purposes of illustration only and the invention is not strictly limited to the exact conditions set forth therein.

EXAMPLE 1

*1-naphthylmethyl alpha-hydroxyisobutyrate*

| Materials | Grams |
|---|---|
| 1-(chloromethyl) naphthalene | 58.8 |
| Alpha-hydroxyisobutyric acid | 16.6 |
| Potassium alpha-hydroxyisobutyric acid | 47.3 |

This reaction mixture was heated for about one hour at 150°–160° C. in a round-bottomed flask fitted with a stirrer. The temperature was then raised to 170°–180° C. and the heating was continued for three hours more. The whole mass was treated with 200 cc. of water, neutralized with sodium hydroxide and then extracted with carbon tetrachloride and dried. After the carbon tetrachloride had been distilled the dark oily liquid remaining was dissolved in naphtha and decolorized with activated charcoal. On cooling a yellow oily layer separated, which crystallized when cooled in an ice-salt bath. The solid was distilled at 128°–133° C. at about 1 mm. pressure, yielding 53 grams or 65% of the theoretical yield of a viscous and light straw-colored product which crystallized on standing overnight. After recrystallization from heptane the alpha-naphthylmethyl alpha-hydroxyisobutyrate melted at 50°–52° C. and had a saponification number of 226.8.

EXAMPLE 2

*Benzyl alpha-hydroxyisobutyrate*

| Materials | Grams |
|---|---|
| Alpha-hydroxyisobutyric acid | 312 |
| Benzyl alcohol | 432 |

These materials were refluxed together in a round-bottomed flask fitted with a 12-inch Vigreaux column and a distillation head which controlled the ratio of reflux to draw-off. The bath temperature was kept at 210° C. to 220° C. for three hours. During this time 54 grams of water was removed. The residue was diluted with carbon tetrachloride, neutralized with sodium bicarbonate and washed with water. After drying on anhydrous sodium sulfate the carbon tetrachloride solution was fractionated at reduced pressure yielding 418 grams or 72% of the theoretical yield of benzyl alpha-hydroxyisobutyrate distilling at 104–108° C./3 mm. The saponification number was found to be about 283.

EXAMPLE 3

*Diphenylmethyl alpha-hydroxyisobutyrate*

| Materials | Grams |
|---|---|
| Benzhydrol (diphenylmethyl alcohol) | 46 |
| Alpha-hydroxyisobutyric acid | 39 |
| Xylene | 150 |

This mixture was heated in an oil bath at 175° C. for four hours during which time 4 cc. of water was removed azeotropically, and then the xylene was removed at reduced pressure.

The residue was neutralized with sodium bicarbonate, washed with water, extracted with benzene and dried. After the benzene was removed by distillation the diphenylmethyl alpha-hydroxyisobutyrate crystallized on cooling. It was recrystallized from naphtha giving 26 grams or 45% of the theoretical yield of a white crystalline product melting at 61°–62° C. and possessing a saponification number of about 213.

EXAMPLE 4

*2-phenethyl alpha-hydroxyisobutyrate*

| Materials | Grams |
| --- | --- |
| 2-phenylethyl alcohol | 41 |
| Alpha-hydroxyisobutyric acid | 41 |
| p-toluenesulfonic acid | 0.5 |

The above reactants were heated at 190°–210° C. for about three hours. During this time 6 cc. of water were obtained. A carbon tetrachloride solution of the product was neutralized with sodium bicarbonate, washed several times with water and dried with sodium sulfate. It was then fractionated at reduced pressure. The yield of 2-phenethyl alpha-hydroxyiso-butyrate was 54 grams or 77% of the theoretical. The ester boiled at 101°–104° C. at about 1 mm. and had a saponification number of about 265.

EXAMPLE 5

*Cinnamyl alpha-hydroxyisobutyrate*

| Materials | Grams |
| --- | --- |
| Cinnamyl alcohol | 67 |
| Alpha-hydroxyisobutyric acid | 62 |

This reaction mixture was heated under reflux at 180° C. for three hours, during which time 9 cc. of water was removed. After neutralizing the carbon tetrachloride solution with sodium bicarbonate, washing several times with water, it was dried on anhydrous sodium sulfate. It was then fractionated at reduced pressure and gave 28 grams or 25% of the theoretical yield of cinnamyl alpha-hydroxyisobutyric acid ester, which distilled at 112°–117° C. at less than 1 mm. pressure and possessed a saponification number of about 256.

EXAMPLE 6

*Alpha-carboethoxyisobutyrate*

When ethyl chlorocarbonate (1 mol) is slowly added to a toluene solution of the benzyl ester of alpha-hydroxyisobutyric acid (1 mol) and pyridine (1 mol) at room temperature pyridine hydrochloride is precipitated and the alpha-carboethoxy derivative of the ester is obtained as illustrated by the following equation:

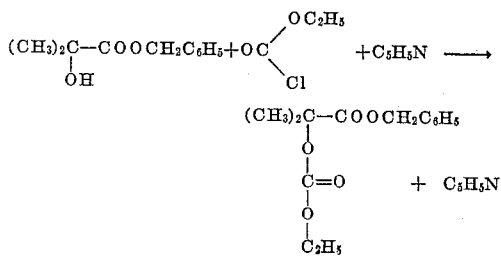

This ester is difficult to distill since it decomposes to yield benzyl methacrylate.

EXAMPLE 7

*Acetylated benzyl ester of alpha-hydroxyisobutyric acid*

When equivalent molecular weights of the benzyl ester of alpha-hydroxyisobutyric acid and acetyl chloride are refluxed for about six hours, and then distilled at reduced pressure the acetylated ester is obtained as illustrated by the following equation:

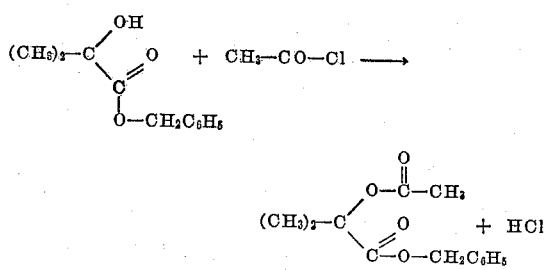

Using a procedure similar to that above, a good yield of the acetyl derivative of benzyl alpha-hydroxyisobutyrate boiling at 110°–115° C. 1–2 mm. was obtained.

EXAMPLE 8

*Benzyl alpha-capryloxyisobutyrate*

Equimolar quantities of the benzyl ester of alpha-hydroxyisobutyric acid and capric acid, protected by an atmosphere of nitrogen, were heated at 160°–220° C. for 70 hours, during which time the acid number of the reaction decreased from 140 to 9. The product was purified by distillation, yielding a colorless mobile liquid, boiling at 160° C./1 mm. and having a saponification number of 161.

EXAMPLE 9

*Alpha-naphthylmethyl-alpha-benzoyloxy-isobutyrate*

Equimolar quantities of alpha-naphthylmethylisobutyrate (Example 1) and benzoyl chloride were mixed together in an excess of pyridine and allowed to stand overnight. This reaction mixture was then heated on a steam bath for about three hours, cooled to room temperature and poured into an excess of cold, dilute hydrochloric acid. The product was extracted with carbon tetrachloride, washed several times with water, dried, and freed of the solvent. The viscous residue which was allowed to stand at room temperature slowly crystallized. The crystalline product which was dissolved in hot naphtha, decolorized with charcoal and recrystallized once more, melted at 76°–77° C.

EXAMPLE 10

*Benzyl alpha-ethoxyisobutyrate*

The benzyl alpha-sodiumoxyisobutyrate was prepared by adding an equivalent of sodium metal to the ester dissolved in benzene and heating on a steam bath until the sodium dissolved. To this solution, cooled in an ice bath, was added a slight excess of diethyl sulfate while keeping the temperature below 15° C. The reaction mixture was then heated at about 85° for three hours. After washing with water and drying on anhydrous sodium sulfate, the excess benzene was removed, and the product distilled at reduced pressure.

EXAMPLE 11

*Benzyl alpha-benzyloxyisobutyrate*

Equimolar quantities of benzyl alpha-sodium-oxyisobutyrate and benzyl chloride in xylene were refluxed for four hours, then washed with water, dried and distilled. A 25% yield (35 g.) of the water-white mobile product distilling at 145° C./5 mm. was obtained. It had a saponification number of 190.

We claim:

1. Compounds having the following general formula:

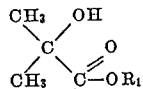

in which $R_1$ is a member of the group consisting of aralkyl and aralkylene radicals.

2. The compound having the formula:

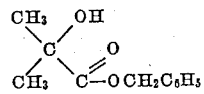

JACK T. THURSTON.
JOHN M. GRIM.